United States Patent
Salste et al.

(10) Patent No.: US 6,383,582 B1
(45) Date of Patent: May 7, 2002

(54) LAMINATED PACKAGE MATERIAL, METHOD FOR MANUFACTURING THE SAME, AND A PACKAGE

(75) Inventors: Matti Salste, Imatra; Tapani Penttinen, Huutjärvi; Jalliina Järvinen, Lahti; Risto Salminen, Karhula; Terttu Heinonen née Määttä, Joensuu; Tuomo Kuuppo, Imatra, all of (FI)

(73) Assignee: Enso Oy, Helsinki (FI)

( * ) Notice: Subject to any disclaimer, the term of this patent is extended or adjusted under 35 U.S.C. 154(b) by 0 days.

(21) Appl. No.: 09/214,787

(22) PCT Filed: Jun. 25, 1997

(86) PCT No.: PCT/FI97/00407

§ 371 Date: Mar. 12, 1999

§ 102(e) Date: Mar. 12, 1999

(87) PCT Pub. No.: WO98/03332

PCT Pub. Date: Jan. 29, 1998

(30) Foreign Application Priority Data

Jul. 17, 1996 (FI) .............................. 962877 U

(51) Int. Cl.[7] .................................. B65D 1/00
(52) U.S. Cl. .................. 428/34.7; 428/34.2; 428/474.4
(58) Field of Search ................ 428/34.2, 34.7, 428/474.4, 500, 515, 516, 475.8, 476.3, 355; 525/240

(56) References Cited

U.S. PATENT DOCUMENTS

| | | | | |
|---|---|---|---|---|
| 4,647,483 A | * | 3/1987 | Tse et al. ...................... | 428/35 |
| 4,701,360 A | | 10/1987 | Gibbons et al. ............ | 428/351 |
| 4,789,575 A | * | 12/1988 | Gibbons et al. ........... | 428/34.2 |
| 4,977,004 A | | 12/1990 | Bettle, III et al. ......... | 428/36.7 |
| 4,981,739 A | * | 1/1991 | Gibbons et al. ........... | 428/34.2 |
| 4,983,431 A | * | 1/1991 | Gibbons et al. ........... | 428/34.2 |
| 4,994,310 A | * | 2/1991 | Frisk et al. ................ | 428/34.2 |
| 5,175,036 A | * | 12/1992 | Smiley et al. ............. | 428/36.7 |
| 5,491,009 A | * | 2/1996 | Bekele ...................... | 428/35.7 |
| 6,068,933 A | * | 5/2000 | Shepard et al. .......... | 428/474.4 |

FOREIGN PATENT DOCUMENTS

| | | |
|---|---|---|
| EP | A1 0-318771 | 6/1989 |
| EP | A2 0-341937 | 11/1989 |
| EP | B1 0-241819 | 7/1990 |
| FI | 86610 | 6/1992 |
| FI | 89567 | 7/1993 |
| FI | 96752 | 5/1996 |

* cited by examiner

Primary Examiner—Harold Pyon
Assistant Examiner—Sow-Fun Hon
(74) Attorney, Agent, or Firm—Birch, Stewart, Kolasch & Birch, LLP

(57) ABSTRACT

The present invention relates to a laminated packaging material suitable for use especially in heat-sealable packages for liquid food, such as milk, cream and juice cartons, and to a manufacturing method of the material, and to a food package manufactured of the material. The material comprises a core of paper or cardboard, and oxygen and aroma proof barrier layers of EVOH and polyamide; it is characteristic of the invention that the EVOH layer (5) and the polyamide layer (4) are joined together directly without any intermediate adhesive layer, and that the barrier layers and the core (3) are interposed between polymeric heat-sealing layers (2, 7) on both sides of the material. The material is manufactured by extrusion so that at least the materials of the said barrier layers (4, 5) are placed against each other in a molten state and forwarded to the core (3) in one web.

13 Claims, 1 Drawing Sheet

LAMINATED PACKAGE MATERIAL, METHOD FOR MANUFACTURING THE SAME, AND A PACKAGE

Figure 1:
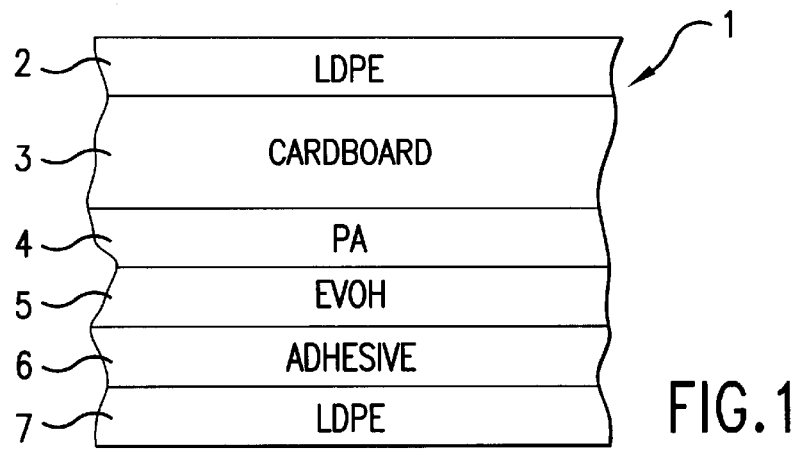

This application is the national phase under 35 U.S.C. §371 of prior PCT International Application No. PCT/FI97/00407 which has an International filing date of Jun. 25, 1997 which designated the United States of America.

The present invention relates to a laminated packaging material which is especially suitable for heat-sealable packages for liquid food, and which comprises a core of paper or cardboard, and oxygen and aroma proof barrier layers of ethylene-vinyl alcohol copolymer (EVOH) and polyamide (PA). Further, the invention relates to a manufacturing method of the same and to a sealed package for liquid food, manufactured of the material, e.g. a milk or juice carton.

Laminated packaging materials used for liquid food packages and based on paper or cardboard are usually provided with one or more barrier layers the purpose of which is to prevent the contamination of the packed product due to oxidation, and to preserve the product's taste and vitamines contained by it. Of polymeric materials, EVOH is known to have excellent barrier properties, but also polyamide has been used in liquid package cardbdards, because of its good barrier properties.

An example of the use of polyamide in a liquid package cardboard is described in the publication print FI 86610 and, correspondingly, the use of EVOH is described, for example, in the publication print FI 89567. In accordance with both the prints, the packaging material has been laminated on both sides with an external heat-sealing layer of LDPE (low-density polyethylene) so that the cardboard layer and the barrier layer of polyamide or EVOH is interposed between the heat-sealing layers. In the patent publication U.S. Pat. No. 4,701,360, there are known laminated packaging materials for liquid packages which may, besides an EVOH layer, include another oxygen proof barrier layer e.g. of polyamide. According to the publication, the EVOH layer is situated on the surface of the packaging material so that it also acts as a heat-sealing layer. In this case, EVOH is in contact with the packed liquid, which is a poorer solution with regard to the barrier properties of the material than the one in which the EVOH layer would be protected by a separate heat-sealing layer.

In the EP publication 0 318 771 there is disclosed a packaging laminate comprising EVOH and polyamide layers in combination with an aluminium foil. According to this publication the aluminium foil constitutes the main gas barrier of the laminate and this barrier has been enhanced by an EVOH layer in order to compensate for small cracks that might occur in the foil. An optional polyamide (nylon) layer may be included to absorb moisture penetrating through said cracks. According to the teachings this layer is in general not necessary but preferred when the laminate is in danger of being subjected to strong external stresses, that is, in danger of developing cracks. If a polyamide layer is included it would have a thickness of 15–25 $\mu$m, preferably 20 $\mu$m. The aluminium foil in such a laminate forms an excellent oxygen barrier, but a drawback is the high cost of the foil.

The problem with EVOH in cardboards for liquid packages is that it is mechanically weak. For example, upon manufacture of carton-shaped packages, the material has to be folded, which easily causes cracks in the EVOH layer weakening its barrier properties. In addition, the EVOH layer tends to form holes in the area of its joints when the package is heat-sealed. This is caused by steam pressure which tries to escape from the cardboard layer because of heat and which EVOH cannot retain. In this respect, polyamide is a better material than EVOH, because it is less vulnerable to cracking upon folding, and it can also absorb moisture released from the cardboard. Because the barrier properties of polyamide are not egual to those of EVOH, it cannot as such replace EVOH, but it has been tried to solve these problems by combining EVOH and polyamide in a packaging material. Thus, the publication print FI 96752 discloses a method for solving the problem related with the formation of holes by a suitable choice of material for the barrier layer, one alternative being a compound of EVOH and polyamide. The purpose is to retain the viscosity and strength of the barrier layer material in the heat-sealing temperature. Also the patent publication U.S. Pat No. 4,977,004 disclosing a food package cardboard comprising two separate EVOH layers recommends the compounding of EVOH and polyamide to improve the viscosity of the layer. However, a drawback of these solutions is that the barrier properties of EVOH suffer due to the compounded polyamide. The best way to make the material oxygen and aroma proof is to include a continuous substantially clean EVOH layer in the packaging material. In addition, it has been discovered that the compound of EVOH and polyamide is more difficult to extrude than pure polymeric materials, mainly due to the tendency of the compound to gel.

It is the object of the present invention to provide a solution for combining EVOH and polyamide especially in a laminated packaging material for liquid food without the above-mentioned drawbacks. Thus, it is the object of the invention to prevent the formation of holes in the layer containing EVOH, and, simultaneously, to keep the amount of polymer in the layers as low as possible. The laminated packaging material of the invention is characterized in that the layer of ethylenevinyl alcohol copolymer (EVOH) and that of polyamide (PA) are joined together without a layer of adhesive material inbetween, and that the material comprises a polymeric heat-sealing layer on both sides so that the core of paper or cardboard and the said barrier layers are interposed between the heat-sealing layers.

Thus, the present inventin is based on the observation that the excellent barrier properties of EVOH and the viscosity and absence of holes in polyamide may be combined, without deteriorating either property, by joining the barrier layers of the said materials directly to each other without an intermediate adhesive layer, such as a Surlyn layer, which has typically been used to adhere different layers in liquid package cardboards. The good adhesion of the EVOH and polyamide layers observed in accordance with the present invention is supposedly due partly to a chemical reaction between polymers and partly to polarity, i.e. the setting of the negatively charged EVOH and the positively charged polyamide. The absence of the adhesive layer reduces the number of layers compared to other conventional multi-layer structures, which means the extrusion process becomes simpler and causes a saving in materials. The saving in materials and the lighter structure may also be achieved because the necessary barrier properties and the absence of holes may be provided with smaller amount of EVOH and polyamide than before. In general the laminated polymeric layers of cardboard potentially have a negative effect on the smell and taste of a product, and, for this reason, the invention serves the general goal to keep the amount of polymers in a packaging material as low as possible. The packaging material of the present invention can also endure the sterilization processes included in aseptic packaging.

In accordance with the present invention, it is characteristic of EVOH and polyamide that they can be joined together or to a core of paper or cardboard in the packaging material without an intermediate adhesive. An adhesive layer may instead be necessary between the barrier layers and the heat-sealing layer on the material surface. The heat-sealing layers on both sides of the material may advantageously be made of polyolefine, such as LDPE. For example surlyn or LDPE modified with maleic anhydride, may be used as adhesive.

In case the barrier layers are arranged in the packaging material so that the polyamide layer is closer to the paper or cardboard core, the polyamide protects the EVOH layer by receiving and absorbing moisture released from the cardboard layer upon heat-sealing. The EVOH layer is protected against the formation of holes, and it retains its impermeability to oxygen and aromas in the joints. However, it is also possible to place the EVOH layer against the paper or cardboard core, which is less advantagous for the tightness of the layers, but which, on the other hand, has the advantage of the excellent adhesion of EVOH to paper or cardboard. In this case, no limits have to be set for the quality of paper or cardboard used in the packaging material.

For the barrier properties, the sufficient amount of polyamide in the packaging material may be about 1–8 $g/m^2$, preferably 2–5 $g/m^2$, and the amount of EVOH likewise about 1–8 $g/m^2$, preferably about 2–5 $g/m^2$. In known packaging materials with a barrier layer either of EVOH or polyamide, the typical amounts have been about 6–8 EVOH/$m^2$ and 8–10 g PA/$m^2$. Thus, the separate, opposite EVOH and polymer layers of the present invention do not increase the amount of polymer required by the barrier layers in the packaging material, but, rather on the contrary, they may be able to reduce it. The amount of polymer in the heat-sealing layer may be about 5–50 $g/m^2$ on both sides of the material.

The method of the present invention for manufacturing the said laminated packaging material, in which polymeric laminate layers are placed on a core of paper or cardboard by extrusion, is characterized in that EVOH and polyamide are placed against each other as molten webs, whereafter they are forwarded to the core in a combined web. The barrier materials then have time to become effectively amalgamated before they meet the paper or cardboard, and, thereafter, solidify.

A liquid food package of the present invention, which is manufactured from the said packaging material by heat-sealing, is typically a sealed carton mainly of rectangular shape, and it may contain, for example, milk, cream, sour milk, yoghurt, juice, or wine. However, it may be mentioned that the polymeric barrier layers do not act as an oxygen or aroma barrier in an unopened package only, but they also help to preserve the product even after the package has been opened.

Figure 2:
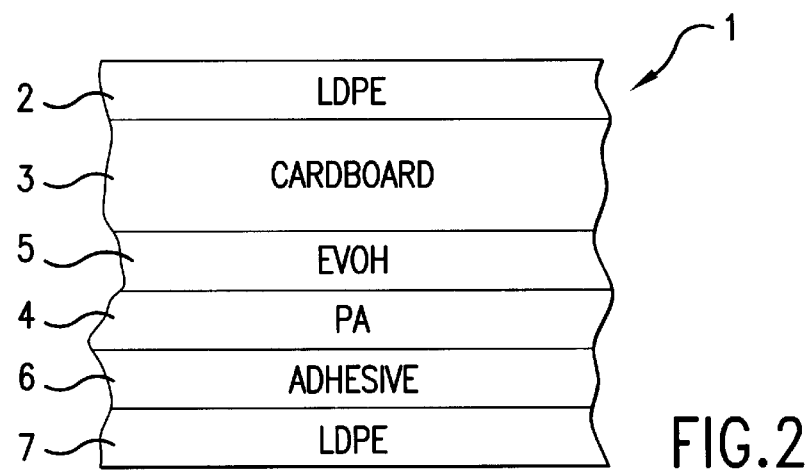
Figure 3:
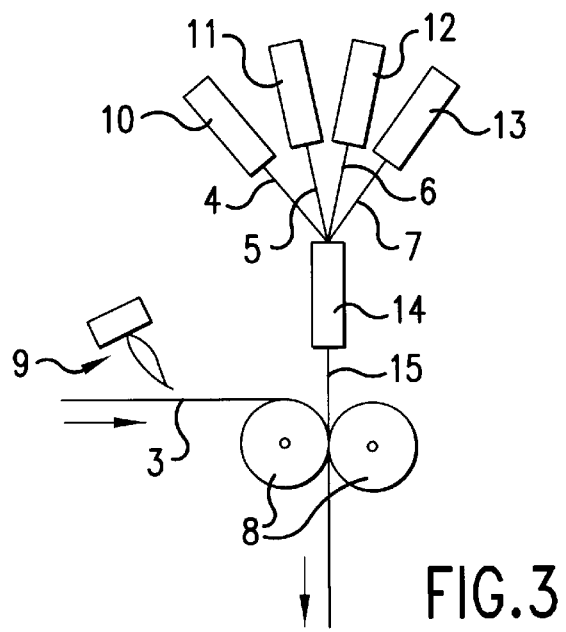

The invention is next described in more detail with the help of embodiment examples and reference tests, and referring to the enclosed drawings in which:

FIG. 1 is a schematic view of a laminated packaging material according to the present invention;, FIG. 2 is a schematic view of another laminated packaging material of the present invention; and FIG. 3 describes extrusion of polymeric layers in the material and their placement on the cardboard.

The second surface layer 2 of the packaging material 1 of the present invention, forming the outer surface of the package to be manufactured and acting as a heat-sealing layer in the package, is made of low-density polyethylene (LDPE). Next, there is the core 3 manufactured of cardboard, e.g. chemithermo-mechanical pulp (CTMP). Thereafter, there are the oxygen and aroma proof barrier layers 4, 5, which are joined together and to the cardboard core 3 without intermediate adhesive layers. In the embodiment of FIG. 1, the barrier layer 4 against the core 3 is polyamide (PA), and the second barrier layer 5 adhered to the polyamide layer is ethylene-vinyl alcohol copolymer (EVOH). The EVOH layer 5 is followed by an adhesive layer 6 of, for example, LDPE modified with maleic anhydride, the purpose of which is to bind the EVOH layer to the second surface layer 7 of the material, which is LDPE. Upon binding, the said surface layer 7 acts as a heat-sealing layer joining the second surface layer 2, and it forms an inner surface which is in contact with the liquid in the finished package.

The package material 1, of FIG. 2 is similar to that in FIG. 1, besides the order of barrier layers 4, 5 of EVOH and polyamide. In FIG. 2, an EVOH layer 5 is placed against the cardboard core 3, the following polyamide layer 4 being joined to the heat-sealable LDPE layer 7 forming the inner surface of the package by an adhesive layer 6.

In FIG. 3, there is schematically shown the manufacture of packaging material 1 according to FIG. 1, which is carried out by extruding the polymeric layers 2, 4–7 to a moving cardboard web 3 forming the material core, the extrusion process being controlled by rollers 8. Before coating, the cardboard web 3 is subjected to corona treatment 9. The four superimposed polymeric layers 4–7 to be placed on the cardboard are each led from their own containers 10–13, from w here the, polymers are guided to a nozzle 14 which amalgamates the molten polymers to each other in layers and feeds the polymers to the cardboard 3 in one combined web 15. Extrusion of a polymeric heat-sealing layer 2 to be placed on the opposite side of the cardboard web 3, not shown in. FIG. 3, may take place substantially in a similar way. The amounts of polymer to be extruded may be e.g. about 2–10 $g/m^2$ in the barrier layer 4, about 2–10 $g/m^2$ in the barrier layer 5, about 3–10 $g/m^2$ in the adhesive layer 6, about 10–50 $g/m^2$ in the heat-sealing layer 2 opposite the material, which is not shown in FIG. 3 the weight of the cardboard core 3 may be about 200–400 $g/m^2$.

Reference Tests

A laminated packaging material according to the invention was manufactured by forming it, in accordance with FIG. 1, from a LDPE layer 2 with a weight of 20 $g/m^2$, a cardboard layer 3, a polyamide layer 4 with a weight of 5 $g/m^2$, an EVOH layer 5 with a weight of 5 $g/m^2$, an adhesive layer 6 with a weight of 5 $g/m^2$, and a LDPE layer 7 with a weight of 41 $g/m^2$. This was compared to three reference materials, the first of which (reference material 1) comprised a LDPE layer with a weight of 14 $g/m^2$, a cardboard layer, an EVOH layer with a weight of 5 $g/m^2$, an adhesive layer with a weight of 6 $g/m^2$, and a LDPE layer with a weight of 45 $g/m^2$; the second (reference material 2) comprised a LDPE layer with a weight of 20 $g/m^2$, a cardboard layer, a polyamide layer with a weight of 5 $g/m^2$, an adhesive layer with a weight of 6 $g/m^2$, and a LDPE layer with a weight, of 41 $g/m^2$; and the third (reference material 3) comprised a LDPE layer with a weight of 20$g/m^2$, a cardboard layer, a barrier layer including as a compound 47.5% EVOH, 47.5% polyamide, and 5% ethylene-methyl acrylate copolymer, with a weight of 5 $g/m^2$, an adhesive layer with a weight of 6 $g/m^2$, and a LDPE layer with a weight of 41 $g/m^2$.

Of the said materials, the oxygen density was first determined by measuring the amount of oxygen which penetrated the material at 23° C. per square meter of the surface in 24 hours as an average of penetration from 2–4 test specimens. The results are shown in Table 1.

TABLE 1

| Material | O$_2$ penetration (cm$^3$/m$^2$/24 h) | Average thickness of the material ($\mu$m) |
| --- | --- | --- |
| Invention | 2.56 | 506 |
| Reference material 1 | 2.87 | 503 |
| Reference material 2 | 7.0 | 505 |
| Reference material 3 | 11.5 | 512 |

The vulnerability of the materials to form holes in the heat-sealing process was thereafter tested by a so-called bubbling test, in which hot-air blasting was used. The test was carried out as follows:

The material specimen to be tested was placed to a stand which moved back and forth with a contestant speed of 200 mm/s under hot-air blasting. The distance from the blower to the surface of the material specimen was 7 mm, and the temperature of the blast air 350° C., and the relative moisture 100%. The blasting made the plastic to melt. The resistance of the material to hole formation could then be determined on the basis of how many times the material passed the blower before the first holes were formed, and how the hole formation developed while the movement continued. The hole formation of the material was researched and rated on a four-step scale which was as follows:

E=undamaged; H=very few holes; V=a few holes; and P=many holes. The results are shown in Table 2.

TABLE 2

| | Number of times passed | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| Invention | E | E | E | E | E | E | E | E | E | E |
| Reference material 1 | E | E | E | H | H | V | P | P | | |
| Reference material 2 | E | E | E | E | E | H | H | H | H | H |
| Reference material 3 | E | E | E | E | E | H | H | H | V | V |

The results show the packaging material of the present invention to be better than the three reference materials. The superiority was especially evident in the bubbling test measuring the vulnerability of the material to hole formation, in which the material of the invention lasted 10 passes (5 reciprocating movements) under hot-air blasting Without hole formation. The test was not continued further, because the cardboard core of the material would have started to become charred. Hole formation was observed in all three reference materials at the latest after six passes, and especially the reference material 1 comprising the mere EVOH layer was totally damaged already after seven passes due to abundant hole formation.

It is obvious for those skilled in the art that various embodiments of the invention are not limited to the above examples, but they can within the scope of the enclosed claims.

What is claimed is:

1. A laminated packaging material especially for heat-sealable liquid food packages, comprising a core of paper or cardboard and oxygen and aroma proof barrier layers consisting of ethylene-vinyl alcohol copolymer and polyamide layers, wherein the weight of the polyamide layer is in the range of 1 to 8 g/m$^2$, and wherein the weight of the ethylene-vinyl alcohol copolymer layer is in the range of 1 to 8 g/m$^2$; that the layer of ethylene-vinyl alcohol copolymer and the layer of polyamide are joined together without an intermediate adhesive layer, and that the material includes polymeric heat-sealing layers on both sides so that the core and the said barrier layers are situated between the heat-sealing layers; wherein the barrier layers joined together are placed directly against the core of paper or cardboard without an intermediate adhesive layer; wherein there is an adhesive layer having a weight in the range of 3 to 10 g/m$^2$ which is between an outer heat-sealing layer and a barrier layer; and wherein the laminated packaging material has an oxygen penetration of no more than 2.6 cm$^3$/m$^2$/24 hr.

2. A packaging material in accordance with claim 1, wherein the barrier layers in the material are arranged in such a way that the polyamide layer is closer to the paper or cardboard core.

3. A packaging material in accordance with claim 1, wherein the barrier layers in the material are arranged in such a way that the ethylene-vinyl alcohol copolymer layer is closer to the paper or cardboard core.

4. A packaging material in accordance with claim 1, wherein the heat-sealing layers forming the surface layers of the material are made of polyolefin.

5. A packaging material in accordance with claim 1, wherein the weight of the polyamide layer is 2 to 5 g/m$^2$.

6. A packaging material in accordance with claim 1, wherein the weight of each of the heat-sealing layers is in the range of 5 to 50 g/m$^2$.

7. A method for manufacturing a packaging material of claim 1, in which the polymeric laminate layers are placed on the paper or the cardboard core by extrusion, wherein the ethylene-vinyl alcohol copolymer and polyamide are placed against each other in molten webs, and thus forwarded to the core in one, combined layer.

8. A sealed package layer for liquid food, wherein the package is manufactured by heat-sealing from a packaging material of claim 1.

9. The laminated packaging material especially for heat-sealable liquid food packages according to claim 1, comprising a core of paper or cardboard and an oxygen and aroma proof barrier layer consisting of polyamide, wherein the polyamide barrier layer is placed directly against the core of paper or cardboard without an intermediate adhesive layer.

10. A packaging material in accordance with claim 4, wherein the polyolefin is low-density polyolefin.

11. A packaging material in accordance with claim 1, wherein the packaging material is a liquid packaging material.

12. A laminated packaging material especially for heat-sealable liquid food packages, comprising a core of paper or cardboard and oxygen and aroma proof barrier layers comprising ethylene-vinyl alcohol copolymer and polyamide layers, wherein the weight of the polyamide layer is in the range of 1 to 8 g/m$^2$ and wherein the weight of the ethylene-vinyl alcohol copolymer layer is in the range of 1 to 8 g/m$^2$, that the layer of ethylene-vinyl alcohol copolymer and the layer of polyamide are joined together without an intermediate adhesive layer, and that the material includes polymeric heat-sealing layers on both sides so that the core and the said barrier layers are situated between the heat-sealing layers; wherein the barrier layers joined together are placed directly against the core of paper or cardboard without an intermediate adhesive layer; and wherein the laminated packaging material has an oxygen penetration of no more than 2.6 cm$^3$/m$^2$/24 hr.

13. A laminated packaging material especially for heat-sealable liquid food packages, comprising a core of paper or cardboard and oxygen and aroma proof barrier layers comprising ethylene-vinyl alcohol copolymer and polyamide layers, wherein the weight of the polyamide layer is in the range of 1 to 8 g/m², and wherein the weight of the ethylene-vinyl alcohol copolymer layer is in the range of 1 to 8 g/m²; that the layer of ethylene-vinyl alcohol copolymer and the layer of polyamide are joined together without an intermediate adhesive layer, and that the material includes polymeric heat-sealing layers on both sides so that the core and the said barrier layers are situated between the heat-sealing layers; wherein the barrier layers joined together are placed directly against the core of paper or cardboard without an intermediate adhesive layer; wherein there is an adhesive layer having a weight in the range of 3 to 10 g/m² which is between an outer heat-sealing layer and a barrier layer; and wherein the laminated packaging material has an oxygen penetration of no more than 2.6 cm³/m²/24 hr.

* * * * *